United States Patent
Liu et al.

(10) Patent No.: US 10,822,242 B2
(45) Date of Patent: Nov. 3, 2020

(54) ZSM-35 MOLECULAR SIEVE AND PREPARATION METHOD THEREOF

(71) Applicant: CHINA UNIVERSITY OF PETROLEUM—BEIJING, Beijing (CN)

(72) Inventors: Haiyan Liu, Beijing (CN); Tao Zheng, Beijing (CN); Zhichang Liu, Beijing (CN); Xianghai Meng, Beijing (CN); Rui Zhang, Beijing (CN); Chunming Xu, Beijing (CN)

(73) Assignee: CHINA UNIVERSITY OF PETROLEUM—BEIJING, Beijing (CN)

( * ) Notice: Subject to any disclaimer, the term of this patent is extended or adjusted under 35 U.S.C. 154(b) by 0 days.

(21) Appl. No.: 16/525,503

(22) Filed: Jul. 29, 2019

(65) Prior Publication Data
US 2020/0038848 A1   Feb. 6, 2020

(30) Foreign Application Priority Data
Aug. 2, 2018 (CN) .......................... 2018 1 0873721

(51) Int. Cl.
*C01B 39/44* (2006.01)
*B01J 29/65* (2006.01)
*B01J 35/00* (2006.01)

(52) U.S. Cl.
CPC .............. *C01B 39/44* (2013.01); *B01J 29/65* (2013.01); *B01J 35/006* (2013.01); *B01J 2229/16* (2013.01); *B01J 2229/60* (2013.01)

(58) Field of Classification Search
CPC ..... C01B 39/46; C01B 39/44; C01P 2004/04; B01J 29/65
See application file for complete search history.

(56) References Cited

U.S. PATENT DOCUMENTS

| | | | |
|---|---|---|---|
| 4,016,245 A | 4/1977 | Plank et al. | |
| 4,146,584 A | 3/1979 | Rollmann | |
| 4,205,053 A | 5/1980 | Rollmann et al. | |
| 4,795,623 A | 1/1989 | Evans | |
| 4,925,548 A | 5/1990 | Rubin | |
| 10,350,585 B1 * | 7/2019 | Al-Herz | B01J 29/041 |
| 2010/0098623 A1 * | 4/2010 | Gagea | C01B 39/04 423/704 |
| 2013/0085311 A1 | 4/2013 | Youn | |

FOREIGN PATENT DOCUMENTS

| | | | | |
|---|---|---|---|---|
| CN | 0 323 269 A1 | 7/1989 | | |
| CN | 1597516 A | 3/2005 | | |
| CN | 101468809 A | 7/2009 | | |
| CN | 101973563 B | 8/2012 | | |
| CN | 103058222 A | 4/2013 | | |
| CN | 104418357 B | 3/2017 | | |
| CN | 110980762 | * | 11/2019 | ............. C01B 39/38 |

OTHER PUBLICATIONS

Wang, Lizhi et al, "Synthesis of ZSM-35 Zeolite Molecular Sieve in Super Concentrated Amine-Free System" Journal of Molecular Catalysis (China), vol. 21 Suppl, (Aug. 2007).

The Chinese First Examination Report and Search Report of corresponding Chinese application No. 201810873721.1, dated Oct. 9, 2019.

* cited by examiner

*Primary Examiner* — David M Brunsman
(74) *Attorney, Agent, or Firm* — J.C. Patents

(57) ABSTRACT

The present application provides a ZSM-35 molecular sieve and a preparation method thereof. The ZSM-35 molecular sieve is an aggregated ZSM-35 molecular sieve having a hierarchical macro-meso-microporous pore structure. Raw materials for the preparation method do not include an organic template agent and a crystal seed, and the preparation method includes the following steps: preparing a reactant gel where a molar ratio of $SiO_2$, $Al_2O_3$, $Na_2O$, $K_2O$, oxygen-containing acid radical and $H_2O$ is (20-40):1.0:(1.5-2.0):(4.0-6.5):(1.0-4.0):(600-1200); sequentially performing an aging treatment and a crystallization treatment on the reactant gel, washing and drying a resulting synthetic product. The ZSM-35 molecular sieve provided by the present application may be obtained by synthesizing without using an organic template agent and crystal seed, and because it has a hierarchical pore structure, it is favorable for material diffusion and mass transfer.

16 Claims, 17 Drawing Sheets

ZSM-35 MOLECULAR SIEVE AND PREPARATION METHOD THEREOF

CROSS-REFERENCE TO RELATED APPLICATION

This application claims priority to Chinese Patent Application No. 201810873721.1, filed on Aug. 2, 2018, which is hereby incorporated by reference in its entirety.

TECHNICAL FIELD

The present application relates to a preparation technology of a molecular sieve catalyst, specifically relates to a ZSM-35 molecular sieve and a preparation method thereof and, in particular, to an aggregated ZSM-35 molecular sieve having a hierarchical macro-meso-microporous pore structure and a green preparation process thereof.

BACKGROUND

A zeolite molecular sieve, especially a silicon-aluminum zeolite molecular sieve material, is widely used in the fields of oil refining and fine chemicals synthesis due to its special pore structure. ZSM-35 molecular sieve is a microporous molecular sieve material with a FER characteristic topology. A pore channel of which in the [001] direction is a ten-membered ring with a size of 0.42×0.54 nm; a pore channel in the [010] direction is an eight-membered ring with a size of 0.35×0.48 nm. ZSM-35 molecular sieve has a two-dimensional intersecting pore channel system that vertically segments a six-membered ring, where a FER cage is a spherical cage of 0.6-0.7 nm formed at an intersection of the eight-membered ring pore channel and the six-membered ring pore channel. ZSM-35 molecular sieve has excellent adsorption property and shape selectivity when being used as catalysts, and has been widely used in the processes of aromatic alkylation, olefin oligomerization and isomerization, xylene isomerization, reforming liquid and naphtha upgrading, and fuel oil pour point lowering, especially in the skeletal isomerization reaction of linear olefins, the ZSM-35 molecular sieve shows very high product selectivity.

As a class of molecular sieve products that have been widely recognized and used, ZSM-35 molecular sieve, like most FER-type zeolites, requires using organics as a structure-directing agent or a template agent in a synthesis process, or using a crystal seed method, these are already generally accepted as the most commonly used process methods.

Many organic amines and some oxygen-containing organic compounds are currently known as the template agent such as ethylenediamine, hexamethylenediamine, pyrrolidine, tetrahydrofuran, cyclohexylamine and the like. Where U.S. Pat. No. 4,016,245 disclosed a method for synthesizing a ZSM-35 molecular sieve using ethylenediamine or pyrrolidine as a template agent; U.S. Pat. No. 4,146,584 disclosed a method for synthesizing a ZSM-35 molecular sieve using butanediamine as a template agent, which showed the molecular sieve prepared using butanediamine as the template agent has higher purity and better performance than that using traditional ethylenediamine and pyrrolidine as template agents; U.S. Pat. No. 4,205,053 disclosed a method for preparing a ZSM-35 molecular sieve, which showed that a nitrogen-containing template agent plus a nitrogen-containing compound may control morphologies and properties of a crystallite; U.S. Pat. No. 4,795,623 disclosed a method for preparing a ZSM-35 molecular sieve using piperidine as a template agent; U.S. Pat. No. 4,925,548 disclosed a method for synthesizing a ZSM-35 molecular sieve using hexamethylimine as a template agent.

CN104418357B disclosed a method for synthesizing a ZSM-35 molecular sieve by a crystal seed induction method using ZSM-35 crystal seed with a weight of 5.0 wt %-10.0 wt % based on a total weight of a $SiO_2$-based silicon source, but the preparation of the crystal seed still required a template agent. CN101973563B synthesized a conventional microporous ZSM-35 molecular sieve by RUB-37 or ZSM-35 as a crystal seed, with the molecular sieve crystal seed being used in an amount of 3%-10% based on a total weight of a silicon source.

In comparison, a molecular sieve obtained using an organic template agent method has higher crystallinity, but the organic template agent is expensive, and the removal of the template agent requires high-temperature roasting and the like, which causes serious environmental pollution; the crystal seed method may synthesize a ZSM-35 molecular sieve without an organic template agent, but the ZSM-35 molecular sieve synthesized at present has a low crystallinity and the amount of crystal seed added is large, and the preparation of the crystal seed still requires using the organic template agent.

In addition, most of ZSM-35 molecular sieves synthesized by conventional techniques are typical microporous molecular sieves, and their application ranges and characteristic performances are based on microporous characteristics, so both synthetic methods and product structural morphology studies pursue distribution and existence of microporous pore channels in the molecular sieves. When being used as a catalyst for conversion of macromolecular reactants, only depending on smaller pore channel structure is not favorable for diffusion and mass transfer of reactants and products, while if mesopores or even macropores are intended to be introduced into a microporous molecular sieve, it needs to use an acid/alkali post-treatment or introduce a mesoscale template agent to achieve pore expanding.

In summary, in the existing ZSM-35 molecular sieve technologies, there is no report about an aggregated ZSM-35 molecular sieve with a hierarchical macro-meso-microporous pore structure, and there is also no report about ZSM-35 molecular sieve synthesis technology under the condition of using no organic template agent or crystal seed.

SUMMARY

With respect to the above deficiencies in the prior art, the present application provides a ZSM-35 molecular sieve, which has an aggregate morphology and has a hierarchical macro-meso-microporous pore structure and is favorable for diffusion and mass transfer of reactants and products.

The present application also provides a preparation method of a ZSM-35 molecular sieve, where an aggregated ZSM-35 molecular sieve having a hierarchical macro-meso-microporous pore structure is synthesized without using an organic template agent and a crystal seed.

To achieve the above object, the present application provides a ZSM-35 molecular sieve, which is an aggregated ZSM-35 molecular sieve having a hierarchical macro-meso-microporous pore structure.

According to the definition of the International Union of Pure and Applied Chemistry (IUPAC), a micropore is a pore with a pore diameter of less than 2 nm; a mesopore has a pore diameter of between 2-50 nm; a macropore has a pore diameter of greater than 50 nm. Therefore, the conclusions for pore channel structure characterization of a molecular sieve of the present application also follow the definition of IUPAC.

The ZSM-35 molecular sieve provided by the present application has a hierarchical macro-meso-microporous pore structure, and all levels of pore distribution or pore channel structure existence may be clearly seen from characterization results, where micropores have a pore volume of no less than 0.120 cm$^3$/g, mesopores have a pore volume of no less than 0.100 cm$^3$/g, macropores have a pore volume of no less than 0.70 cm$^3$/g, the pore diameter distribution of macropores is mainly concentrated within 700 nm, and a sphere-like aggregate morphology may be detected. Thus, the ZSM-35 molecular sieve has a good adsorptive property, which is favorable for diffusion and mass transfer of reactants and products, especially for diffusion and mass transfer of materials during the process of the relatively larger-size molecules' conversion; and has a higher conversion efficiency and isomerization selectivity when it used for C4 or C5 skeletal isomerization.

The ZSM-35 molecular sieve provided by the present application may be prepared according to a method including steps of:

preparing a reactant gel where a molar ratio of SiO$_2$, Al$_2$O$_3$, Na$_2$O, K$_2$O, oxygen-containing acid radical and H$_2$O is (20-40):1.0:(1.5-2.0):(4.0-6.5):(1.0-4.0):(600-1200); and sequentially performing an aging treatment and a crystallization treatment on the reactant gel, and washing and drying a resulting synthetic product to obtain the ZSM-35 molecular sieve.

The above aggregated ZSM-35 molecular sieve with a hierarchical pore structure may be obtained by preparing a composition-given reactant gel and performing aging and crystallization processes on the reactant gel. In particular, in the above preparation method, raw materials used may not contain an organic template agent and a crystal seed, that is, the ZSM-35 molecular sieve may be prepared without using an organic template agent and a crystal seed, thereby avoiding a series of problems, such as environmental pollution and high cost caused by the use of the organic template agent and the crystal seed as in traditional preparation processes. And because the raw materials used are all conventional materials that are harmless, the ZSM-35 molecular sieve may be obtained through a green and environmental friendly process and has an advantage of low cost.

Moreover, the ZSM-35 molecular sieve prepared using the above preparation method may provide a molecular sieve product with higher relative crystallinity, being higher than the relative crystallinity of a ZSM-35 molecular sieve synthesized by a crystal seed method, and is further favorable for playing catalytic performance thereof.

The present application also provides a preparation method of a ZSM-35 molecular sieve, where raw materials for the preparation method do not contain an organic template agent and a crystal seed, including steps of:

preparing a reactant gel where a molar ratio of SiO$_2$, Al$_2$O$_3$, Na$_2$O, K$_2$O, oxygen-containing acid radical and H$_2$O is (20-40):1.0:(1.5-2.0):(4.0-6.5):(1.0-4.0):(600-1200); and sequentially performing an aging treatment and a crystallization treatment on the reactant gel, washing and drying a resulting synthetic product to obtain the ZSM-35 molecular sieve.

According to the preparation method of the present application, under the condition of using no organic template agent and crystal seed, by adjusting given composition of a reactant gel, and utilizing synergistic action of potassium ions and sodium ions, and using a small amount of oxygen-containing acid radicals as a nucleating promoter to promote the nucleation of the ZSM-35 molecular sieve and shorten crystallization time, the synthesized ZSM-35 molecular sieve has a sphere-like aggregate morphology and a hierarchical macro-meso-microporous pore structure, and most of macropores have a distribution of less than 700 nm, which is favorable for mass transfer and diffusion of materials, especially for diffusion and mass transfer of materials during the process of the larger-size molecules' conversion, and may improve conversion efficiency and isomerization selectivity when molecular sieve is used for C4 or C5 skeletal isomerization. At the same time, since the raw materials required for synthesizing the ZSM-35 molecular sieve do not contain toxic and harmful substances, the whole preparation process is green and environmentally friendly, and the operation steps are simple and easy to operate.

In the present application, the reaction raw materials for preparing the reactant gel include an aluminum source, a silicon source, acid phosphate, and water, and the oxygen-containing acid radical in the reactant gel is derived from the acid phosphate.

As the name suggests, the aluminum source and the silicon source in the reaction raw materials are used to provide Al$_2$O$_3$ and SiO$_2$, respectively. In the present application, both of the aluminum source and the silicon source may be commonly used aluminum source and silicon source in the current ZSM-35 molecular sieve synthesis processes, for example, the aluminum source may specifically be sodium metaaluminate, which provides Na ions (Na$_2$O) while providing Al$_2$O$_3$; and the silicon source may specifically be a silica sol or white carbon black.

Moreover, the preparation method of the present application has low requirements on raw materials, and industrial grade raw materials may be used to obtain a ZSM-35 molecular sieve having desired properties. For example, the aluminum source may use industrial grade sodium metaaluminate, where NaAlO$_2$ has a mass fraction of 80%. The silicon source may be selected from industrial grade silica sol or industrial grade white carbon black. Industrial grade silica sol is generally used, with a mass concentration of 30% and containing about 0.45% sodium oxide based on silicon dioxide.

Specifically, the above acid phosphate may be monohydrogen phosphate, for example selected from dipotassium hydrogen phosphate, disodium hydrogen phosphate or diammonium hydrogen phosphate, or a mixture of the above various monohydrogen phosphates, monohydrogen phosphate radical (HPO$_4^{2-}$) provided by them, as a nucleating promoter, may effectively promote the nucleation of ZSM-35 molecular sieve and shorten crystallization time. Of course, if the acid phosphate is selected from dipotassium hydrogen phosphate or disodium hydrogen phosphate, potassium ions (K$_2$O) or sodium ions (Na$_2$O) are correspondingly provided in the reactant gel.

In the present application, a molar ratio of sodium to potassium (both by their oxide forms) in the reactant gel is critical for performances of a ZSM-35 molecular sieve product. The inventor finds that when the molar ratio of other components is maintained to meet the above requirements, when the molar ratio of Na$_2$O to K$_2$O is (1.5-2.0):4.0, that is, the molar ratio of SiO$_2$, Al$_2$O$_3$, Na$_2$O, K$_2$O, oxygen-containing acid radical and H$_2$O is (20-40):1.0:(1.5-2.0):4.0:(1.0-4.0):(600-1200), the synthesized product is an eutectic of mordenite (MOR) and FER. While when the molar ratio of Na$_2$O to K$_2$O goes beyond the above range, for example, when the molar ratio of other components satisfies the above requirements, but the molar ratio of $Na_2O$ to $K_2O$ is 3.5:2.0 or 2.0:3.5, the obtained product is MOR.

Therefore, when the molar ratio of $Na_2O$ to $K_2O$ in the reactant gel does not satisfy the above range, one or more of sodium hydroxide, potassium hydroxide, sodium chloride and potassium chloride may be added to the reaction raw materials in an appropriate amount to adjust concentration of potassium ions or sodium ions, respectively, so as to make the ratio of sodium to potassium maintains within the above range. At the same time, the added sodium hydroxide and/or potassium hydroxide are/is also used to adjust the pH of the reactant gel to maintain in a weakly alkaline range, generally the pH is controlled to be 10-12. In general, first sodium hydroxide and/or potassium hydroxide are/is added to make the pH meet the requirement, for example, to make the pH reach about 10.5 or 11, and then an appropriate amount of sodium chloride and/or potassium chloride are/is added to reach the above required ratio of sodium to potassium.

Mixing of all the above raw materials may be carried out in accordance with conventional operations in the art. Specifically, the above raw materials may be added to mix in an order of aluminum source, alkali (sodium hydroxide and/or potassium hydroxide), water, oxysalt, silicon source, and supplemented water so as to obtain a reactant gel. In a specific implementation process of the present application, the alkali is first dissolved in part of water until it is completely dissolved, then the aluminum source is added, and after the solution is clarified, an aqueous solution of the oxysalt is added and uniformly mixed, next the silicon source is added dropwise, and after the addition of the silicon source is completed, the remaining part of the water is supplemented, to obtain the reactant gel.

The aging of the reactant gel may be carried out at 25-40° C. for at least 2 h, generally 2-4 h. For example, the aging may be carried out while maintaining a stirring state and the time of the aging process may be based on system temperature, and a higher temperature accelerates the aging process, and vice versa. For example, when an aging temperature is controlled to be about 25° C., an aging time is about 4 h.

The reactant gel that the aging is completed may then be subjected to a crystallization treatment. Generally, a crystallization temperature is controlled to be 150-195° C. and a crystallization time is at least 48 h. The present application uses oxygen-containing acid radical as a nucleating promoter, shortens the crystallization time. Therefore, generally the crystallization time being controlled to be 48-120 h may obtain a highly crystallized ZSM-35 molecular sieve.

It can be understood that the crystallization time may be appropriately adjusted according to the crystallization temperature. Generally, the higher the crystallization temperature, the shorter the crystallization time. For example, the crystallization is performed at 150-160° C. for about 120 h, or at 170-180° C. for about 72 h or at 190-195° C. for about 48 h.

In addition to the above one-stage crystallization mode, a two-stage crystallization mode may be employed, that is, firstly a pre-crystallization (the first-stage crystallization) is performed, then the second-stage crystallization is performed by adjusting temperature. Specifically, the first-stage crystallization (or called high-temperature pre-crystallization) is performed at a high temperature of 175-195° C. for 6-24 h, and then the second-stage crystallization is performed at 150-175° C. for 6-72 h; or, the first-stage crystallization (or called low-temperature pre-crystallization) is performed at a low temperature of 150-175° C. for 6-24 h, and then the second-stage crystallization is performed at 175-195° C. for 48-72 h.

In a specific implementation process provided by the present application, firstly a high-temperature pre-crystallization is performed at 190-195° C. for 6-10 h, and then a crystallization is performed at 150-160° C. for about 65-72 h; or firstly a pre-crystallization is performed at 150-160° C. for about 20-24 h, and then a crystallization is performed at 175-195° C. for about 70-72 h.

The inventor has found that the morphology of a product obtained by the low-temperature pre-crystallization is substantially the same as that obtained by the one-stage crystallization, while the crystal size and aggregate size of a product obtained by the high-temperature pre-crystallization are significantly smaller. Therefore, appropriate crystallization modes and conditions may be selected according to actual needs, for example, a ZSM-35 molecular sieve with a smaller crystal size and an aggregate size may be obtained by the high-temperature pre-crystallization.

Specifically, the crystallization process can be carried out by a dynamic crystallization, in particular, a rotational dynamic crystallization. For example, it is carried out in a rotating oven, and a rotation speed is controlled to be 30-60 rpm. In a specific implementation process of the present application, the reactant gel after the aging has completed is charged into a polytetrafluoroethylene-lined high-pressure reactor, and is subjected to a dynamic crystallization in a rotating oven at 150-195° C. with a rotation speed of 30-60 rpm.

A synthesized product after the crystallization has been completed may be first subjected to solid-liquid separation, and then the resulting solid portion is washed and dried to obtain a target product. Where the solid-liquid separation and the washing are conventional operations well known to persons of ordinary skill in the art. For example, the solid-liquid separation may be carried out by filtrating, and the washing generally means washing with deionized water until generally the product is neutral or near neutral. Usually the solid-liquid separation and the washing include multiple operations, generally 1-3 times. The drying is usually carried out at 100-140° C. for 5-12 h, effectively removing water in the synthesized product, thus obtaining the ZSM-35 molecular sieve.

The ZSM-35 molecular sieve provided by the present application has a hierarchical macro-meso-microporous pore structure and a spheroid-like aggregate morphology, and thus has a good adsorptive property, which is favorable for diffusion and mass transfer of materials, especially for diffusion and mass transfer of materials during larger-size molecules' conversion process; and has higher conversion efficiency and isomerization selectivity when being using for C4 or C5 skeletal isomerization. Moreover, the ZSM-35 molecular sieve may be prepared without an organic template agent and crystal seed, thereby it has the advantages of simple preparation process, friendly to environment and low cost.

A preparation method of a ZSM-35 molecular sieve provided by the present application has the following advantages:

1) the prepared product is a ZSM-35 molecular sieve with a hierarchical macro-meso-microporous pore structure and a spheroid-like aggregate morphology, so that the ZSM-35 molecular sieve has good adsorptive property and catalytic property, which will be favorable for diffusion and mass transfer of materials when it is applied to larger-size molecules' conversion processes, and it has higher conversion efficiency and isomerization selectivity when being used for C4 or C5 skeletal isomerization;

2) the preparation method can synthesize a pure phase ZSM-35 molecular sieve without an expensive, toxic and harmful organic template agent, and subsequently there is no need to roasting and deaminizing, having less environmental pollution;

3) the preparation method promotes nucleation by introducing oxygen-containing acid radical ions, but not using a crystal seed, which not only shortens crystallization time, but also a relative crystallinity of the synthesized ZSM-35 molecular sieve is higher than that of a ZSM-35 molecular sieve synthesized by a crystal seed method, and the preparation process is environmental friendly;

4) Using the preparation method may introduce a certain amount of mesopores without an acid/base post-treatment or introduction of a mesoscale template agent, so that not only the prepared ZSM-35 molecular sieve has a hierarchical macro-meso-microporous pore structure and a spheroid-like aggregate morphology;

but also operations in the whole preparation process are simple and routine operations in the field, and raw materials used are non-toxic and harmless, and the whole preparation process is green and environment-friendly, which is convenient for practical application and promotion;

5) The silicon and aluminum sources used are of industrial grade purity, and are cheap and easy to get. At the same time, the addition of a nucleating promoter shortens crystallization time, reduces energy consumption, raw material cost and time cost, and is more conducive to industrial application.

DETAILED DESCRIPTION OF EMBODIMENTS

Figure 1:
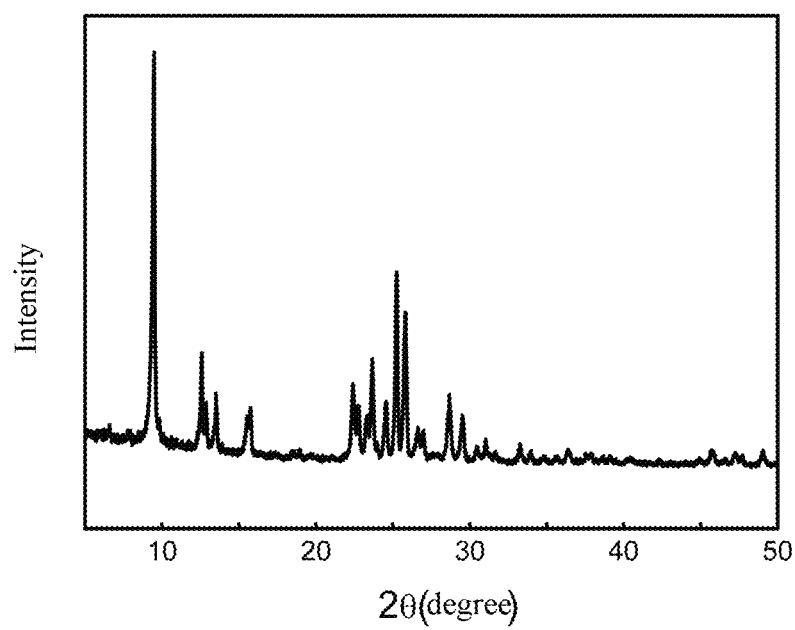
FIG. 1 is an X-ray diffraction (XRD) spectrum of a ZSM-35 molecular sieve prepared according to Example 1 of the present application.

To make the objectives, technical solutions, and advantages of embodiments of the present application clearer, the following clearly and comprehensively describes the technical solutions in the embodiments of the present application with reference to the accompanying drawings of the embodiments of the present application. Apparently, the described embodiments are merely part of embodiments rather than all embodiments of the present application.

In the following examples and comparative examples:

XRD spectrums were measured by a Bruck AXS D8 Advance X-ray diffractometer, Germany;

SEM photographs were taken from a Zeiss ULTRA 55 field emission scanning electron microscope, Germany;

BET specific surface area and pore structure parameters of a sample were measured using a Quanta chrome Autosorb iQ high performance fully automatic gas adsorber. Where the specific surface area of the sample was calculated by BET equation according to an adsorption equilibrium isotherm with a relative pressure between 0.05 to 0.25; a total pore volume is calculated by conversing an adsorption amount at a relative pressure of 0.99 into a liquid nitrogen volume; micropore specific surface area and micropore volume of the sample were calculated by a t-plot model; pore diameter distributions of mesopores and micropores of the sample were calculated by Barrett-Joyner-Halenda (BJH) method.

A mercury intrusion adsorption experiment of the sample was carried out on an AutoPore IV 9500 mercury intrusion apparatus manufactured by Micromeritics Company, USA, with an experimental pressure of 0-30000 psia.

The mentioned relative crystallinity of the ZSM-35 molecular sieve refers to a ratio, in percentage, of the sums of peak areas at 2θ=9.3°, 22.3°, 22.5°, 23.3°, 23.5°, 24.4°, 25.2° and 25.6° in a XRD spectrum of a synthesized product. The crystallinity of a ZSM-35 molecular sieve sample (Comparative Example 4) synthesized by the crystal seed method was set to be 100%.

Example 1

1.415 g of potassium hydroxide having a purity of 95 wt. % was dissolved in 20 g of deionized water, and after stirring well, 1.23 g of sodium metaaluminate having a purity of 80 wt. % was added, stirring until to clear and transparent. At the same time, 2.088 g of dipotassium hydrogen phosphate having a purity of 95 wt. % was dissolved in 10 g of deionized water, which was dropwise added to the above clear and transparent solution, continuing to stir for 15 min, and then 24 g of a silica sol having a concentration of 30 wt. % (based on $SiO_2$, the same below) was dropwise added to the resulting solution, a small amount of deionized water was supplemented after the addition of the silica sol was completed, intensely stirring for 30 minutes to obtain a reactant gel. The molar ratio of components in the reactant gel is about: $1.5Na_2O:4K_2O:20SiO_2:1Al_2O_3:2HPO_4^{2-}:600H_2O$.

Under stirring, the reactant gel was aged at about 25° C. for about 4 h to prepare a reactant gel precursor.

The reactant gel precursor was transferred to a 100 mL reactor having a polytetrafluoroethylene liner, and dynamically crystallized in an oven at 175° C. for 72 h with a rotational speed of 60 rpm. After the end of the crystallization, a resulting synthetic product was filtered, washed with deionized water until neutral, and then dried at 120° C. for 5 h.

Figure 2:
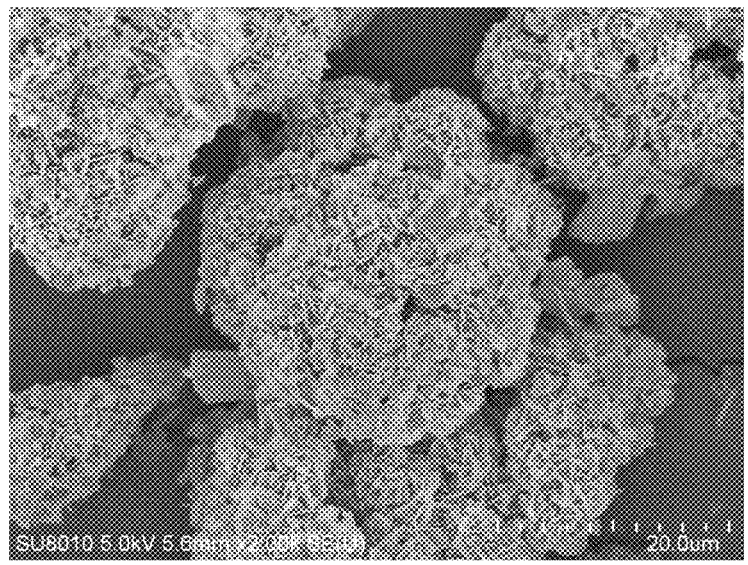
FIG. 2 is a 2000-fold magnified field emission scanning electron microscope (SEM) photograph of the ZSM-35 molecular sieve prepared according to Example 1 of the present application.
Figure 3:
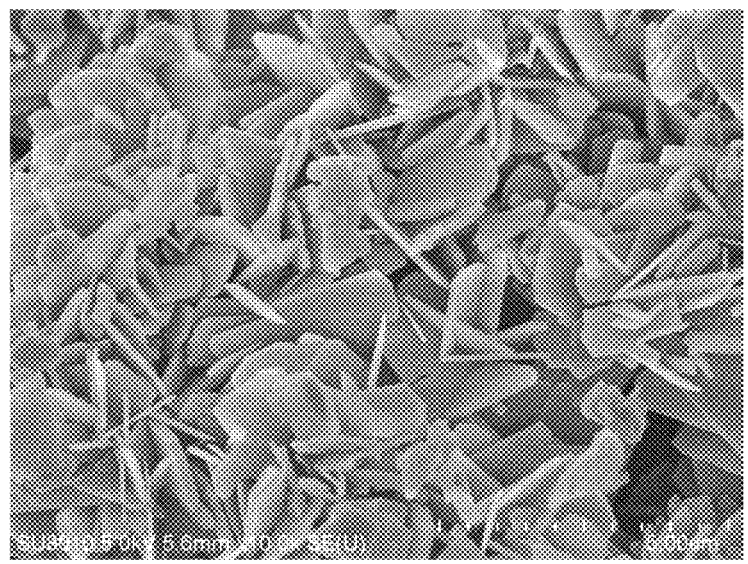
FIG. 3 is a 10000-fold magnified SEM photograph of the ZSM-35 molecular sieve prepared according to Example 1 of the present application.

It is determined through XRD that phase of the synthetic product belongs to a ZSM-35 molecular sieve with a relative crystallinity of 112.6%, as shown in FIG. 1. It is determined through SEM that the ZSM-35 molecular sieve had a sphere-like aggregate morphology formed by stacking of crystal nanosheets, as shown in FIGS. 2 and 3.

Figure 4:
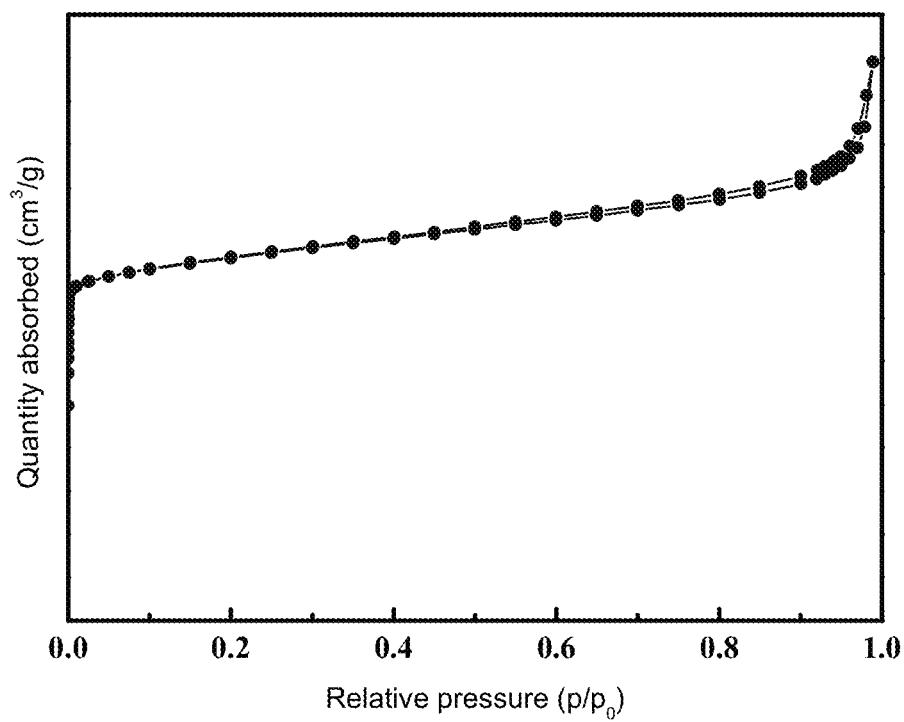
FIG. 4 is a $N_2$ adsorption-desorption isotherm curve of the ZSM-35 molecular sieve prepared according to Example 1 of the present application.
Figure 5:
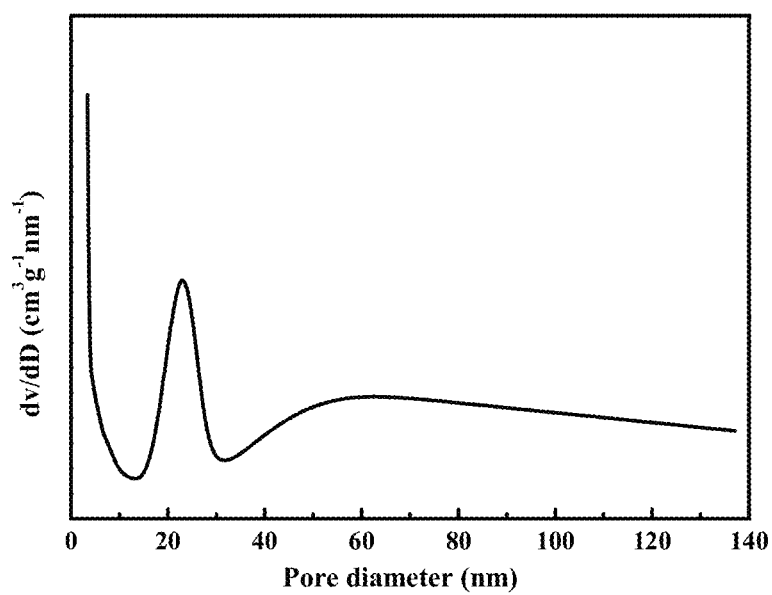
FIG. 5 is a BJH pore diameter distribution diagram of the ZSM-35 molecular sieve prepared according to Example 1 of the present application.

It is determined through gas sorption analyzer that the sample had a BET specific surface area of 325.3 m²/g, a microporous pore volume of 0.134 cm³/g, a mesoporous pore volume of 0.118 cm³/g, and a typical I and IV mixed type adsorption isotherm as shown in FIG. 4, indicating that the sample had an obvious meso-microporous pore channel structure characteristic; its hysteresis loop type belongs to H4 type, indicating that the adsorbent is a material containing narrow fracture-pores; as shown in a BJH pore diameter distribution diagram of FIG. 5, mesopores were distributed at 25-35 nm, while a certain amount of macropores were distributed at 60-100 nm.

Figure 6:
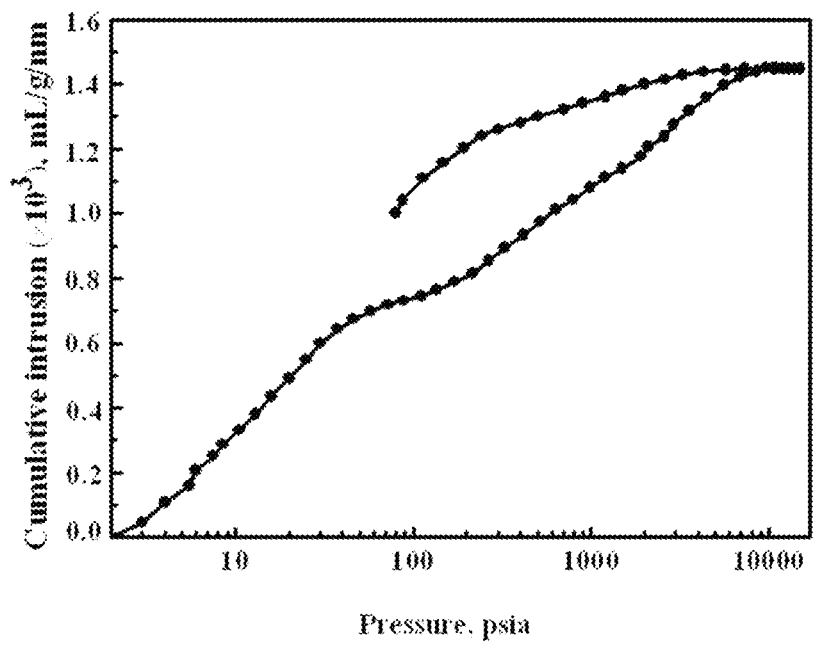
FIG. 6 is a mercury injection/mercury removal curve of the ZSM-35 molecular sieve prepared according to Example 1 of the present application.
Figure 7:
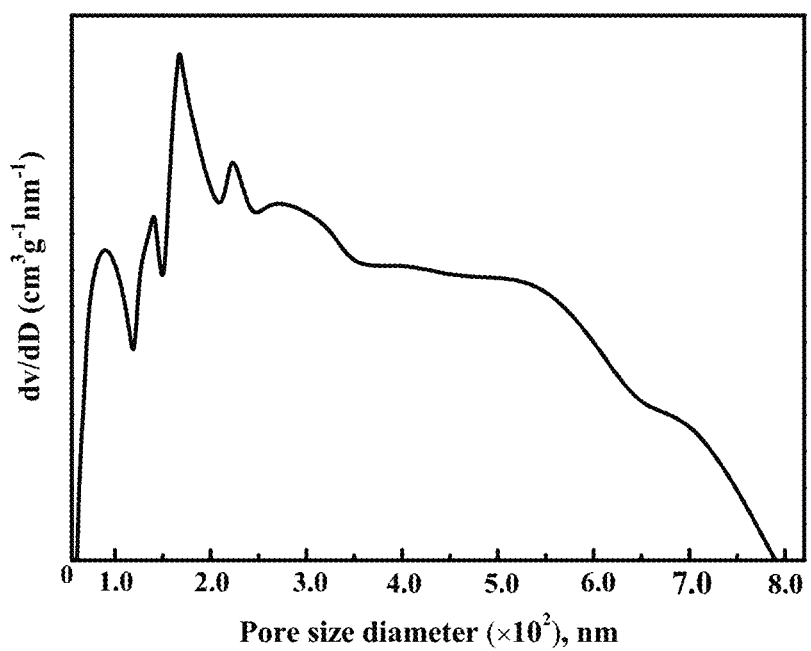
FIG. 7 is a pore diameter distribution diagram corresponding to a mercury intrusion method of the ZSM-35 molecular sieve prepared according to Example 1 of the present application.

A mercury injection/mercury removal curve measured by a mercury intrusion method was shown in FIG. 6. There was a large hysteresis loop in the curve, indicating that there was a large number of macroporous pore channels in the sample, the macropores had a pore volume of 0.83 cm³/g. It could also be known from a corresponding pore diameter distribution curve diagram (FIG. 7) that there were scattered macroporous pore channels in the sample, and the pore diameter distribution thereof is 100-700 nm.

The above results showed that the obtained ZSM-35 molecular sieve sample had a hierarchical macro-meso-microporous pore structure.

Figure 8:
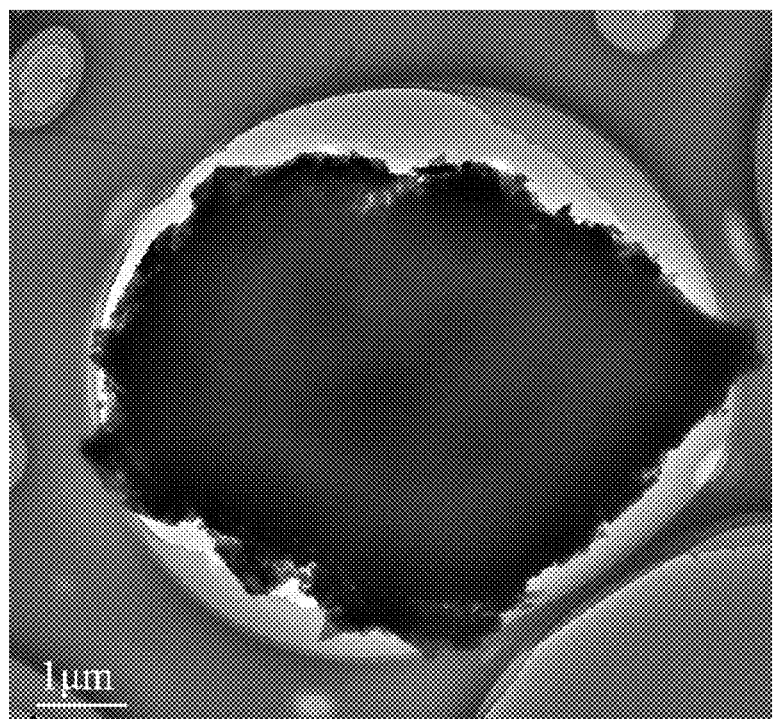
FIG. 8 is a transmission electron microscope (TEM) image of the ZSM-35 molecular sieve prepared according to Example 1 of the present application.
Figure 9:
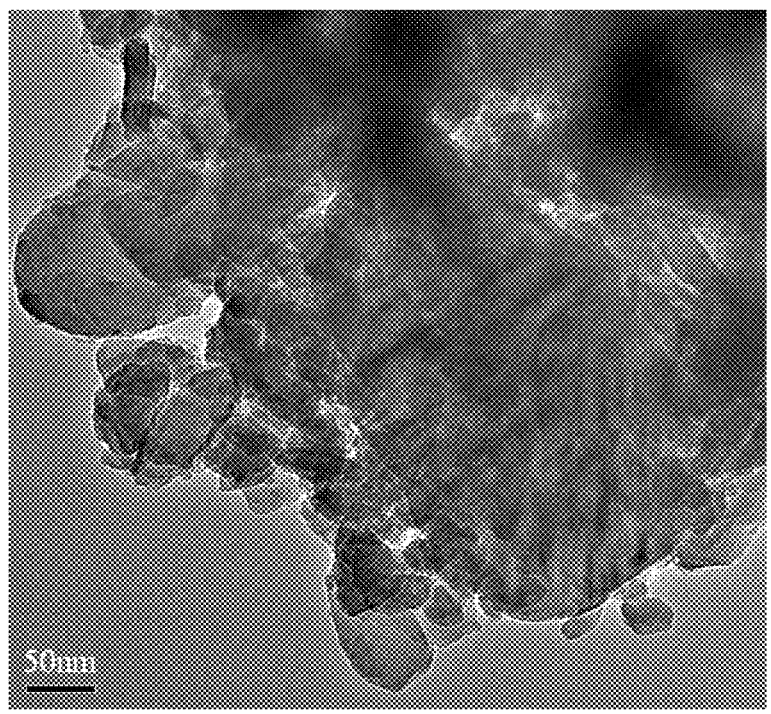
FIG. 9 is a partial high magnification TEM image of the ZSM-35 molecular sieve prepared according to Example 1 of the present application.

FIG. 8 and FIG. 9 were transmission electron microscope images of the ZSM-35 molecular sieve, and FIG. 8 and FIG. 9 showed that the ZSM-35 molecular sieve had a particle size of about 6 μm, and light transmitting portions in the figures were mesopores or macropores formed by stacking between crystal nanosheets.

Example 2

1.415 g of potassium hydroxide having a purity of 95 wt. % was dissolved in 20 g of deionized water, and after stirring well, 1.23 g of sodium metaaluminate having a purity of 80 wt. % was added, stirring until clear and transparent. At the same time, 1.044 g of dipotassium hydrogen phosphate having a purity of 95 wt. % and 0.894 g of potassium chloride having a purity of 98 wt. % were dissolved in 10 g of deionized water, which was dropwise added to the above clear and transparent solution, stirring for 15 min, and then 24 g of silica sol having a concentration of 30 wt. % was dropwise added to the resulting solution, a small amount of deionized water was supplemented after the addition of the silica sol was completed, intensely stirring for 30 minutes to obtain a reactant gel. The molar ratio of components in the reactant gel is about: $1.5Na_2O:4K_2O:20SiO_2:1Al_2O_3:1HPO_4^{2-}:600H_2O$.

Under stirring, the reactant gel was aged at about 40° C. for about 2 h to prepare a reactant gel precursor.

The reactant gel precursor was transferred to a 100 mL reactor having polytetrafluoroethylene liner, and dynamically crystallized in an oven at 175° C. for 72 h with a rotational speed of 60 rpm. After the end of the crystallization, a resulting synthetic product was filtered, washed with deionized water until neutral, and then dried at 120° C. for 5 h.

Figure 10:
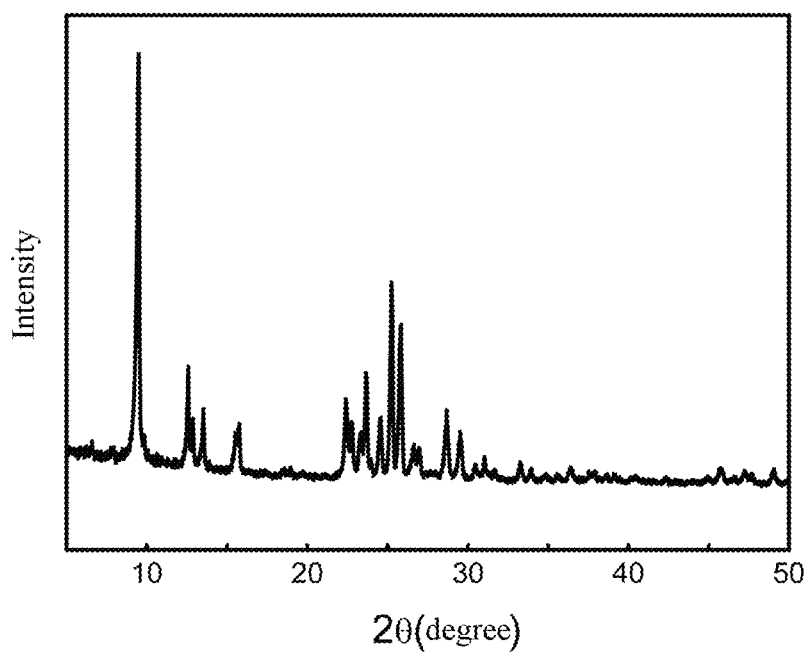
FIG. 10 is a XRD spectrum of a ZSM-35 prepared according to Example 2 of the present application.
Figure 11:
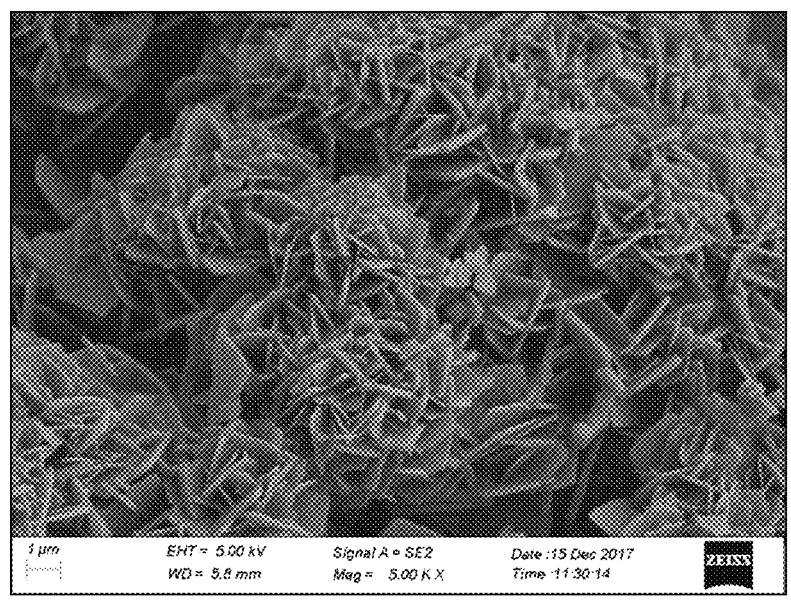
FIG. 11 is a 5000-fold magnified SEM photograph of the ZSM-35 prepared according to Example 2 of the present application.

It is determined through XRD that phase of the synthetic product belongs to a ZSM-35 molecular sieve with a relative crystallinity of 104.5%, as shown in FIG. 10. It is determined through SEM that the ZSM-35 molecular sieve has a sphere-like aggregate formed by stacking of crystal nanosheets, as shown in FIG. 11.

Figure 12:
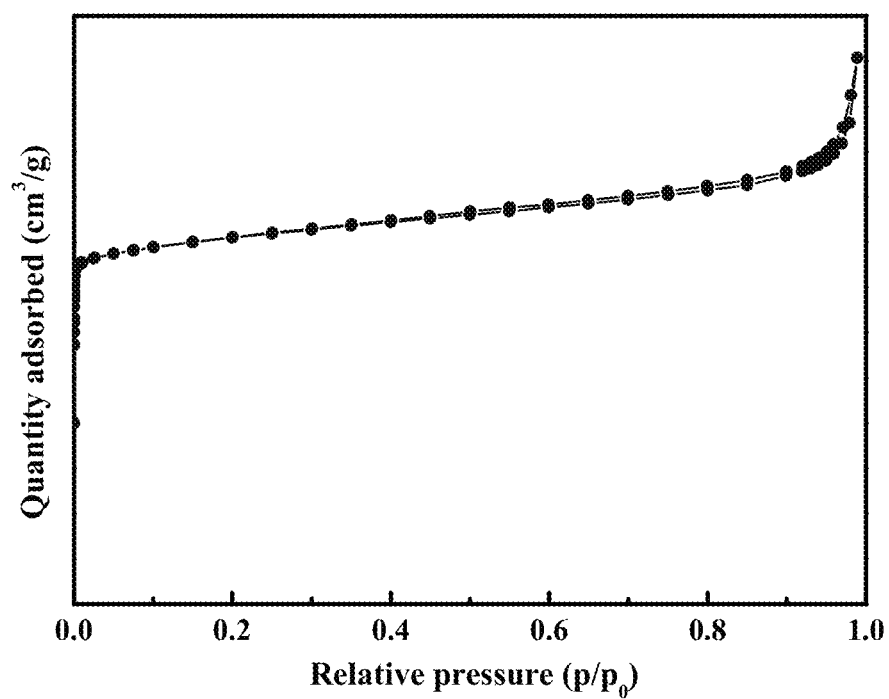
FIG. 12 is a $N_2$ adsorption-desorption isotherm curve of the ZSM-35 molecular sieve prepared according to Example 2 of the present application.
Figure 13:
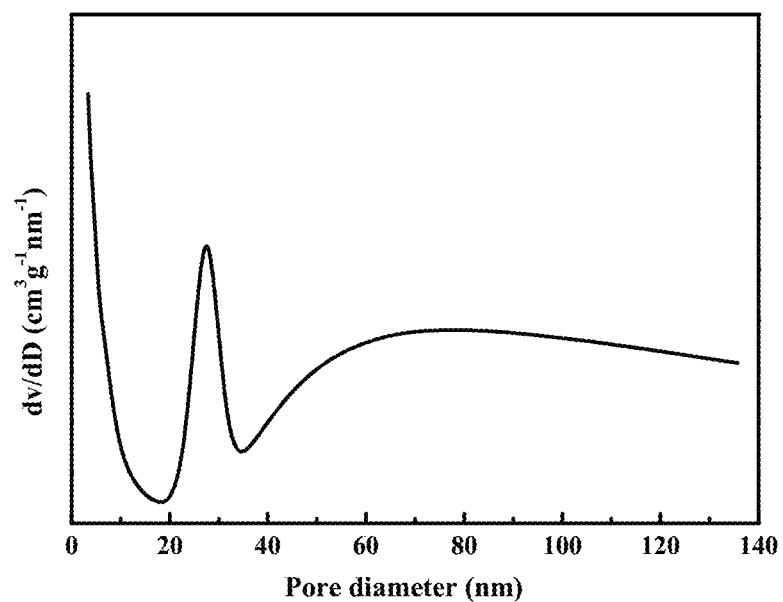
FIG. 13 is a BJH pore diameter distribution diagram of the ZSM-35 molecular sieve prepared according to Example 2 of the present application.

It is determined through gas sorption analyzer that the sample had a BET specific surface area of 312 m²/g, a microporous pore volume of 0.131 cm³/g, a mesoporous pore volume of 0.109 cm³/g, and a typical I and IV mixed type adsorption isotherm, as shown in FIG. 12, indicating that, as the same as Example 1, the sample also had a meso-microporous pore channel structure characteristic; its hysteresis loop type belonged to H4 type, indicating that the adsorbent is a material containing narrow fracture-pores; It could be known from a BJH pore diameter distribution diagram (FIG. 13) that mesopores of the molecular sieve were distributed at 20-30 nm, while a certain amount of macropores were at 40-80 nm. A mercury intrusion experiment showed that the sample had macroporous pore channels with a macroporous pore volume of 0.81 cm$^3$/g and a macroporous pore diameter distribution of 100-650 nm.

The above results showed that the obtained ZSM-35 molecular sieve sample had a hierarchical macro-meso-microporous pore structure.

Example 3

0.825 g of potassium hydroxide having a purity of 95 wt. % was dissolved in 20 g of deionized water, and after stirring well, 0.718 g of sodium metaaluminate having a purity of 80 wt. % was added, stirring until clear and transparent. At the same time, 1.218 g of dipotassium hydrogen phosphate having a purity of 95 wt. % was dissolved in 10 g of deionized water, which was dropwise added to the above clear and transparent solution, stirring for 15 min, and then 14 g of silica sol having a concentration of 30 wt. % was dropwise added to the solution, a small amount of deionized water was supplemented after the addition of the silica sol was completed, intensely stirring for 30 minutes to obtain a reactant gel. The molar ratio of components in the reactant gel is about: $1.5Na_2O:4K_2O:20SiO_2:1Al_2O_3:2HPO_4^{2-}$: $1200H_2O$.

Under stirring, the reactant gel was aged at about 31-32° C. for about 3 h to prepare a reactant gel precursor.

The reactant gel precursor was transferred to a 100 mL reactor having polytetrafluoroethylene liner, and dynamically crystallized in an oven at 175° C. for 72 h with a rotational speed of 60 rpm. After the end of the crystallization, a resulting synthetic product was filtered, washed with deionized water until neutral, and then dried at 120° C. for 5 h.

Figure 14:
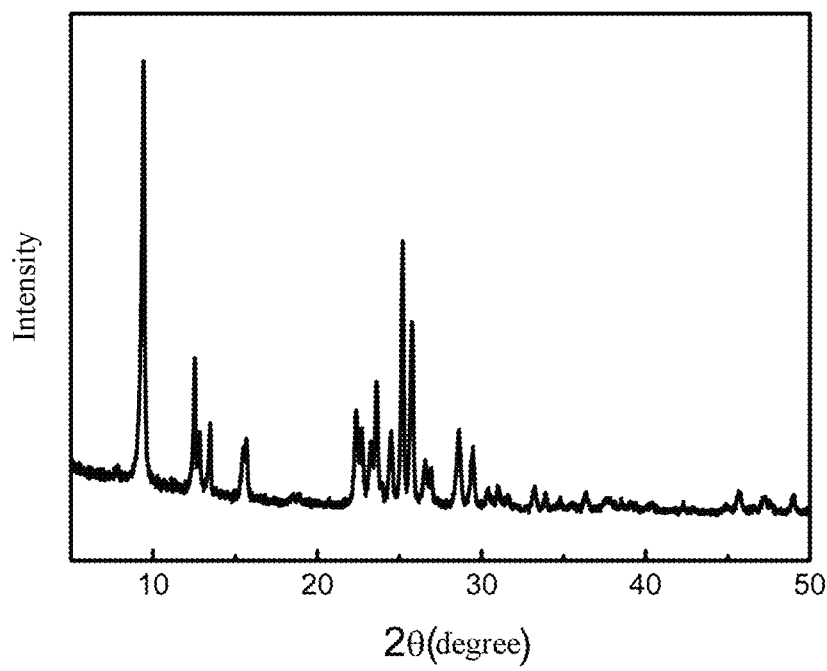
FIG. 14 is a XRD spectrum of a ZSM-35 prepared according to Example 3 of the present application.
Figure 15:
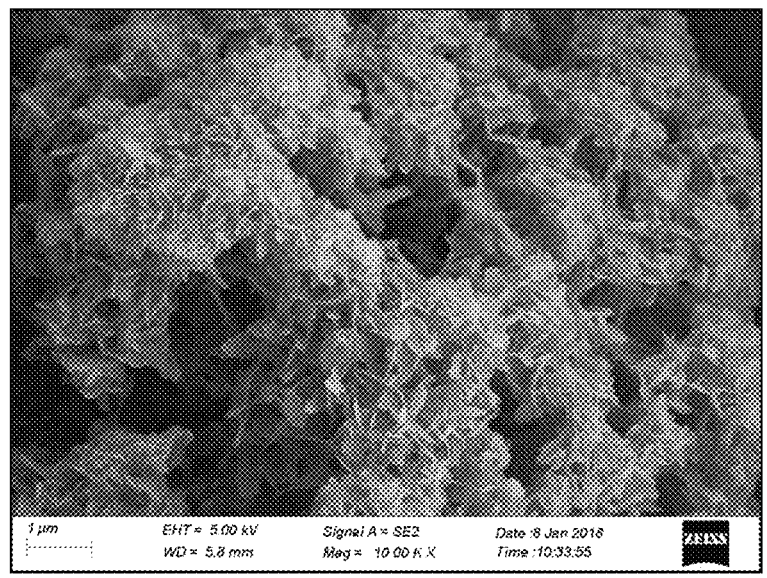
FIG. 15 is a 10000-fold magnified SEM photograph of the ZSM-35 prepared according to Example 3 of the present application.

It is determined through XRD that phase of the synthetic product belongs to a ZSM-35 molecular sieve with a relative crystallinity of 109.6%, as shown in FIG. 14. It is determined through SEM that the ZSM-35 molecular sieve has a sphere-like aggregate formed by stacking of crystal nanosheets, as shown in FIG. 15.

It is determined through gas sorption analyzer that the sample had a BET specific surface area of 332 m$^2$/g, a microporous pore volume of 0.131 cm$^3$/g, a mesoporous pore volume of 0.119 cm$^3$/g, and mesopores thereof were distributed at 25-35 nm, while a certain amount of macropores were at 45-80 nm. A mercury intrusion experiment showed that the sample had macroporous pore channels with a macroporous pore volume of 0.75 cm$^3$/g and a macroporous pore diameter distribution of 100-650 nm.

The above results showed that the obtained ZSM-35 molecular sieve sample had a hierarchical macro-meso-microporous pore structure.

Example 4

1.415 g of potassium hydroxide having a purity of 95 wt. % was dissolved in 20 g of deionized water, and after stirring well, 1.23 g of sodium metaaluminate having a purity of 80 wt. % was added, stirring until clear and transparent. At the same time, 2.088 g of dipotassium hydrogen phosphate having a purity of 95 wt. % was dissolved in 10 g of deionized water, which was dropwise added to the above clear and transparent solution, stirring for 15 min, and then 24 g of silica sol having a concentration of 30 wt. % was dropwise added to the solution, a small amount of deionized water was supplemented after the addition of the silica sol was completed, intensely stirring for 30 minutes to obtain a reactant gel. The molar ratio of components in the reactant gel is about: $1.5Na_2O:4K_2O:20SiO_2:1Al_2O_3:2HPO_4^{2-}$: $600H_2O$.

Under stirring, the reactant gel was aged at about 25° C. for about 4 h to prepare a reactant gel precursor.

The reactant gel precursor was transferred to a 100 mL reactor having polytetrafluoroethylene liner, and dynamically crystallized in an oven at 150° C. for 120 h with a rotational speed of 60 rpm. After the end of the crystallization, a resulting synthetic product was filtered, washed with deionized water until neutral, and then dried at 120° C. for 5 h.

Figure 16:
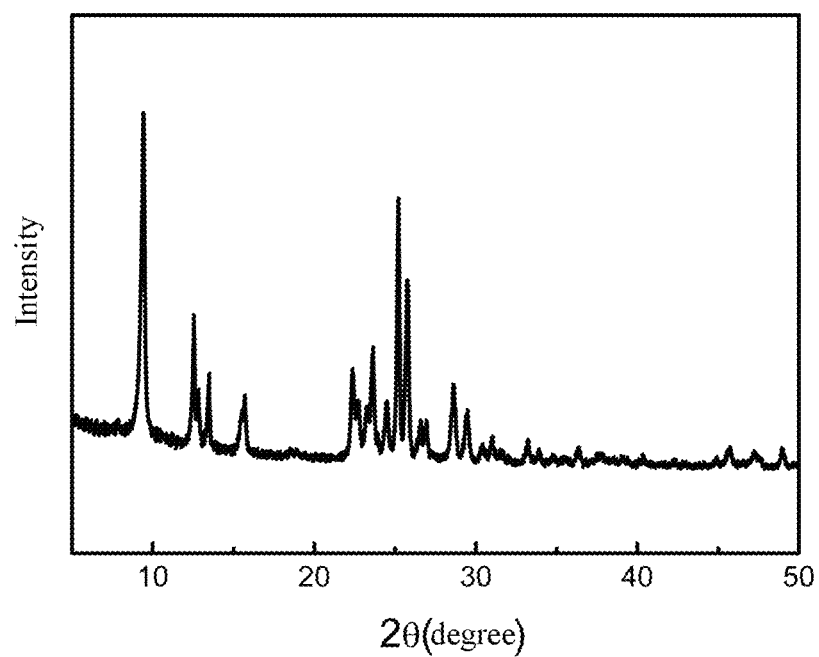
FIG. 16 is a XRD spectrum of a ZSM-35 prepared according to Example 4 of the present application.

It is determined through XRD that phase of the synthetic product belongs to a ZSM-35 molecular sieve with a relative crystallinity of 100.5%, as shown in FIG. 16. It is determined through SEM that the ZSM-35 molecular sieve has a sphere-like aggregate morphology formed by stacking of crystal nanosheets.

It is determined through gas sorption analyzer that the sample had a BET specific surface area of 332 m$^2$/g, a microporous pore volume of 0.124 cm$^3$/g, a mesoporous pore volume of 0.126 cm$^3$/g, and mesopores thereof were distributed at 15-25 nm, while a certain amount of macropores were at 45-80 nm. A mercury intrusion experiment showed that the sample had macroporous pore channels with a macroporous pore volume of 0.78 cm$^3$/g and a macroporous pore diameter distribution of 100-600 nm.

The above results showed that the obtained ZSM-35 molecular sieve sample had a hierarchical macro-meso-microporous pore structure.

Example 5

1.415 g of potassium hydroxide having a purity of 95 wt. % was dissolved in 20 g of deionized water, and after stirring well, 1.23 g of sodium metaaluminate having a purity of 80 wt. % was added, stirring until clear and transparent. At the same time, 2.088 g of dipotassium hydrogen phosphate having a purity of 95 wt. % was dissolved in 10 g of deionized water, which was dropwise added to the above clear and transparent solution, stirring for 15 min, and then 24 g of silica sol having a concentration of 30 wt. % was dropwise added to the solution, a small amount of deionized water was supplemented after the addition of the silica sol was completed, intensely stirring for 30 minutes to obtain a reactant gel. The molar ratio of components in the reactant gel is about: $1.5Na_2O:4K_2O:20SiO_2:1Al_2O_3:2HPO_4^{2-}$: $600H_2O$.

Under stirring, the reactant gel was aged at 25-40° C. for 2-4 h to prepare a reactant gel precursor.

The reactant gel precursor was transferred to a 100 mL reactor having polytetrafluoroethylene liner, and dynamically crystallized in an oven at 195° C. for 48 h with a rotational speed of 60 rpm. After the end of the crystallization, a resulting synthetic product was filtered, washed with deionized water until neutral, and then dried at 120° C. for 5 h.

Figure 17:
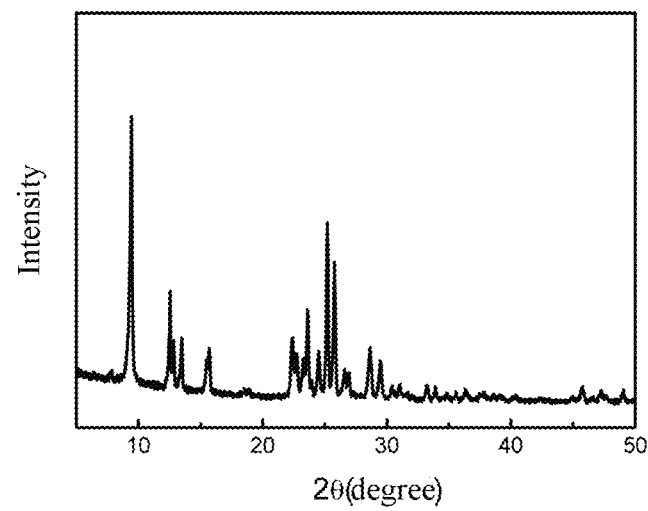
FIG. 17 is a XRD spectrum of a ZSM-35 prepared according to Example 5 of the present application.

It is determined through XRD that phase of the synthetic product belongs to a ZSM-35 molecular sieve with a relative crystallinity of 103.5%, as shown in FIG. 17. It is determined through SEM that the ZSM-35 molecular sieve has a sphere-like aggregate morphology formed by stacking of crystal nanosheets.

It is determined through gas sorption analyzer that the sample had a BET specific surface area of 332 m$^2$/g, a microporous pore volume of 0.121 cm$^3$/g, a mesoporous pore volume of 0.119 cm$^3$/g, and mesopores thereof were distributed at 20-35 nm, while a certain amount of macropores were at 40-90 nm. A mercury intrusion experiment showed that the sample had macroporous pore channels with a macroporous pore volume of 0.80 cm$^3$/g and a macroporous pore diameter distribution of 100-600 nm.

The above results showed that the obtained ZSM-35 molecular sieve sample had a hierarchical macro-meso-microporous pore structure.

Example 6

1.415 g of potassium hydroxide having a purity of 95 wt. % was dissolved in 20 g of deionized water, and after stirring well, 1.23 g of sodium metaaluminate having a purity of 80 wt. % was added, stirring until clear and transparent. At the same time, 2.088 g of industrial grade dipotassium hydrogen phosphate having a purity of 95 wt. % was dissolved in 10 g of deionized water, which was dropwise added to the above clear and transparent solution, stirring for 15 min, and then 24 g of silica sol having a concentration of 30 wt. % was dropwise added to the solution, a small amount of deionized water was supplemented after the addition of the silica sol was completed, intensely stirring for 30 minutes to obtain a reactant gel. The molar ratio of components in the reactant gel is about: 1.5Na$_2$O:4K$_2$O:20SiO$_2$:1Al$_2$O$_3$:2HPO$_4^{2-}$:600H$_2$O.

Under stirring, the reactant gel was aged at about 28° C. for about 3.5 h to prepare a reactant gel precursor.

The reactant gel precursor was transferred to a 100 mL reactor having polytetrafluoroethylene liner, pre-crystallized in an oven at 150° C. for 24 h, and then dynamically crystallized at 175° C. for 72 h, the rotational speed was maintained at 60 rpm throughout the crystallization process. After the end of the crystallization, a resulting synthetic product was filtered, washed with deionized water until neutral, and then dried at 120° C. for 5 h.

Figure 18:
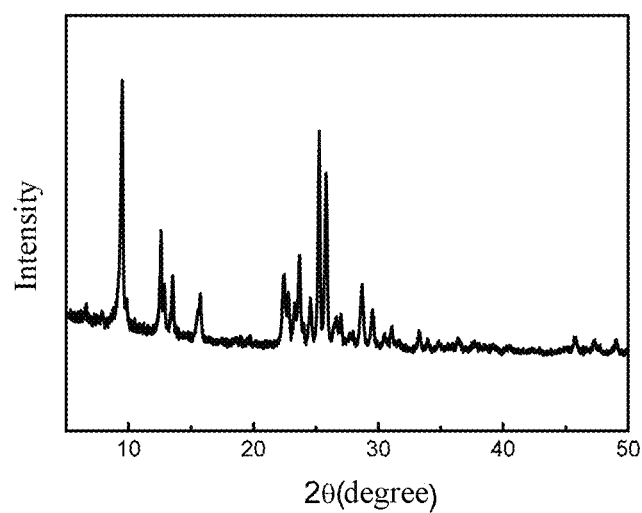
FIG. 18 is a XRD spectrum of a ZSM-35 prepared according to Example 6 of the present application.

It is determined through XRD that phase of the synthetic product belongs to a ZSM-35 molecular sieve with a relative crystallinity of 102.8%, as shown in FIG. 18. It is determined through SEM that the ZSM-35 molecular sieve has a sphere-like aggregate morphology formed by stacking of crystal nanosheets.

It is determined through gas sorption analyzer that the sample had a BET specific surface area of 342 m$^2$/g, a microporous pore volume of 0.132 cm$^3$/g, a mesoporous pore volume of 0.112 cm$^3$/g, and mesopores thereof were distributed at 25-40 nm, while a certain amount of macropores were at 50-90 nm. A mercury intrusion experiment showed that the sample had macroporous pore channels with a macroporous pore volume of 0.84 cm$^3$/g and a macroporous pore diameter distribution of 100-700 nm.

The above results showed that the obtained ZSM-35 molecular sieve sample had a hierarchical macro-meso-microporous pore structure.

Example 7

1.415 g of potassium hydroxide having a purity of 95 wt. % was dissolved in 20 g of deionized water, and after stirring well, 1.23 g of sodium metaaluminate having a purity of 80 wt. % was added, stirring until clear and transparent. At the same time, 2.088 g of dipotassium hydrogen phosphate having a purity of 95 wt. % was dissolved in 10 g of deionized water, which was dropwise added to the above solution, stirring for 15 min, and then 24 g of silica sol having a concentration of 30 wt. % was dropwise added to the solution, a small amount of deionized water was supplemented after the addition of the silica sol was completed, intensely stirring for 30 minutes to obtain a reactant gel. The molar ratio of components in the reactant gel is about: 1.5Na$_2$O:4K$_2$O:20SiO$_2$:1Al$_2$O$_3$:2HPO$_4^{2-}$:600H$_2$O.

Under stirring, the reactant gel was aged at 25-40° C. for 2-4 h to prepare a reactant gel precursor.

The reactant gel precursor was transferred to a 100 mL reactor having polytetrafluoroethylene liner, pre-crystallized in an oven at 195° C. for 6 h, and then dynamically crystallized at 150° C. for 72 h, with a rotational speed of 60 rpm. After the end of the crystallization, a resulting synthetic product was filtered, washed with deionized water until neutral, and then dried at 120° C. for 5 h.

Figure 19:
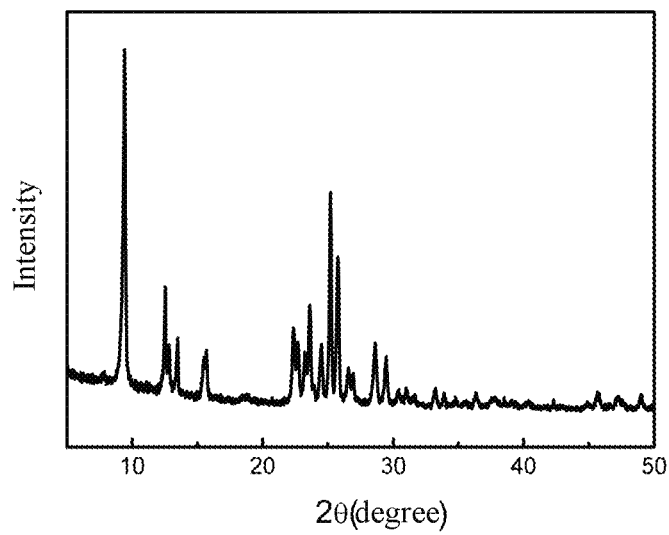
FIG. 19 is a XRD spectrum of a ZSM-35 prepared according to Example 7 of the present application.
Figure 20:
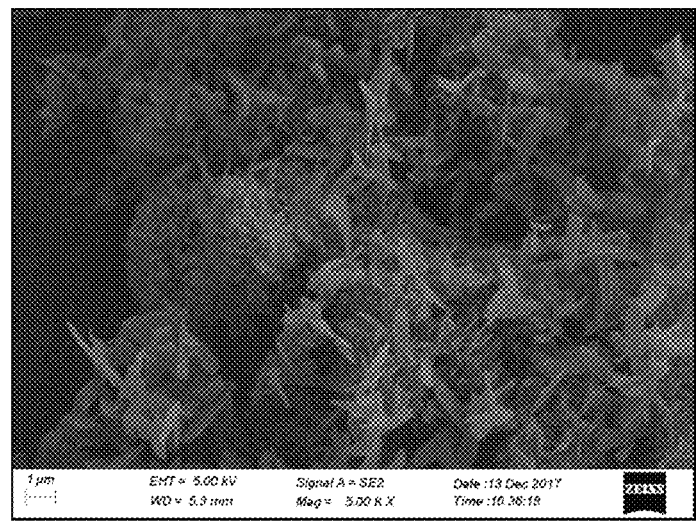
FIG. 20 is a 5000-fold magnified SEM photograph of the ZX-35 prepared according to Example 7 of the present application.

It is determined through XRD that phase of the synthetic product belongs to a ZSM-35 molecular sieve with a relative crystallinity of 108.7%, as shown in FIG. 19. It is determined through SEM that the ZSM-35 molecular sieve has a sphere-like aggregate formed by stacking of crystal nanosheets, and significantly small crystal size and aggregate size, as shown in FIG. 20.

It is determined through gas sorption analyzer that the sample had a BET specific surface area of 353 m$^2$/g, a microporous pore volume of 0.124 cm$^3$/g, a mesoporous pore volume of 0.128 cm$^3$/g, and mesopores thereof were distributed at 15-35 nm, while a certain amount of macropores were at 50-70 nm. A mercury intrusion experiment showed that the sample had macroporous pore channels with a macroporous pore volume of 0.73 cm$^3$/g and a macroporous pore diameter distribution of 100-650 nm.

The above results showed that the obtained ZSM-35 molecular sieve sample had a hierarchical macro-meso-microporous pore structure.

Example 8

1.238 g of potassium hydroxide having a purity of 95 wt. % and 0.077 g of sodium hydroxide having a purity of 99 wt. % were dissolved in 20 g of deionized water, and after stirring well, 0.861 g of industrial grade sodium metaaluminate having a purity of 80 wt. % was added, stirring until clear and transparent. At the same time, 2.923 g of dipotassium hydrogen phosphate having a purity of 95 wt. % was dissolved in 10 g of deionized water, which was dropwise added to the above solution, stirring for 15 min, and then 33.6 g of silica sol having a concentration of 30 wt. % was dropwise added to the solution, a small amount of deionized water was supplemented after the addition of the silica sol was completed, intensely stirring for 30 minutes to obtain a reactant gel. The molar ratio of components in the reactant gel is about: 2Na$_2$O:6.5K$_2$O:40SiO$_2$:1Al$_2$O$_3$:4HPO$_4^{2-}$:800H$_2$O.

Under stirring, the reactant gel was aged at 25-40° C. for 2-4 h to prepare a reactant gel precursor.

The reactant gel precursor was transferred to a 100 mL reactor having polytetrafluoroethylene liner, and dynamically crystallized in an oven at 175° C. for 72 h with a rotational speed of 60 rpm. After the end of the crystallization, a resulting synthetic product was filtered, washed with deionized water until neutral, and then dried at 120° C. for 5 h.

Figure 21:
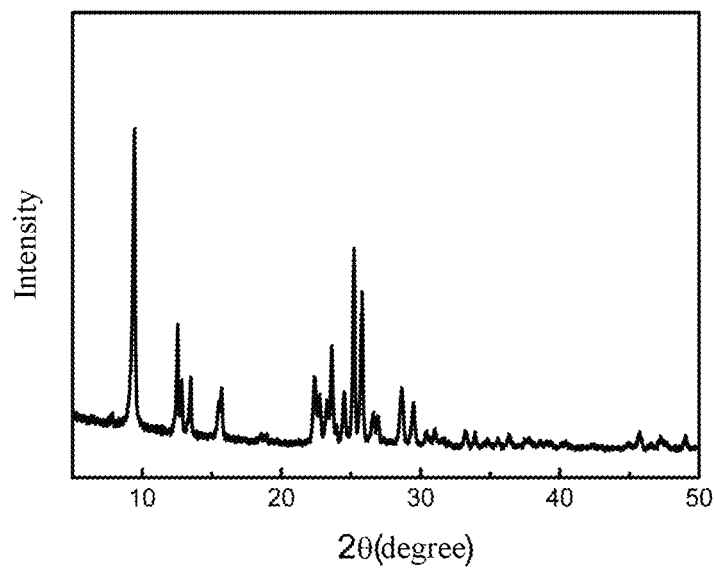
FIG. 21 is a XRD spectrum of a ZSM-35 prepared according to Example 8 of the present application.

It is determined through XRD that phase of the synthetic product belongs to a ZSM-35 molecular sieve with a relative crystallinity of 108.5%, as shown in FIG. 21. It is determined through SEM that the ZSM-35 molecular sieve has a sphere-like aggregate formed by stacking of crystal nanosheets.

It is determined through gas sorption analyzer that the sample had a BET specific surface area of 342 m$^2$/g, a microporous pore volume of 0.126 cm$^3$/g, a mesoporous pore volume of 0.129 cm$^3$/g, and mesopores thereof were distributed at 20-30 nm, while a certain amount of macropores were at 40-80 nm. A mercury intrusion experiment showed that the sample had macroporous pore channels with a macroporous pore volume of 0.72 cm$^3$/g and a macroporous pore diameter distribution of 100-650 nm.

The above results showed that the obtained ZSM-35 molecular sieve sample had a hierarchical macro-meso-microporous pore structure.

Comparative Example 1

0.97 g of sodium hydroxide having a purity of 99 wt. % was dissolved in 20 g of deionized water, and after stirring well, 1.23 g of sodium metaaluminate having a purity of 80 wt. % was added, stirring until clear and transparent. At the same time, 2.088 g of dipotassium hydrogen phosphate having a purity of 95 wt. % was dissolved in 10 g of deionized water, which was dropwise added to the above solution, stirring for 15 min, and then 24 g of silica sol having a concentration of 30 wt. % was dropwise added to the solution, a small amount of deionized water was supplemented after the addition of the silica sol was completed, intensely stirring for 30 minutes to obtain a reactant gel. The molar ratio of components in the reactant gel is about: 3.5Na$_2$O:2K$_2$O:20SiO$_2$:1Al$_2$O$_3$:2HPO$_4^{2-}$:600H$_2$O.

Under stirring, the reactant gel was aged at 25-40° C. for 2-4 h to prepare a reactant gel precursor.

The reactant gel precursor was transferred to a 100 mL reactor having polytetrafluoroethylene liner, and dynamically crystallized in an oven at 175° C. for 72 h with a rotational speed of 60 rpm. After the end of the crystallization, a resulting synthetic product was filtered, washed with deionized water until neutral, and then dried at 120° C. for 5 h.

Figure 22:
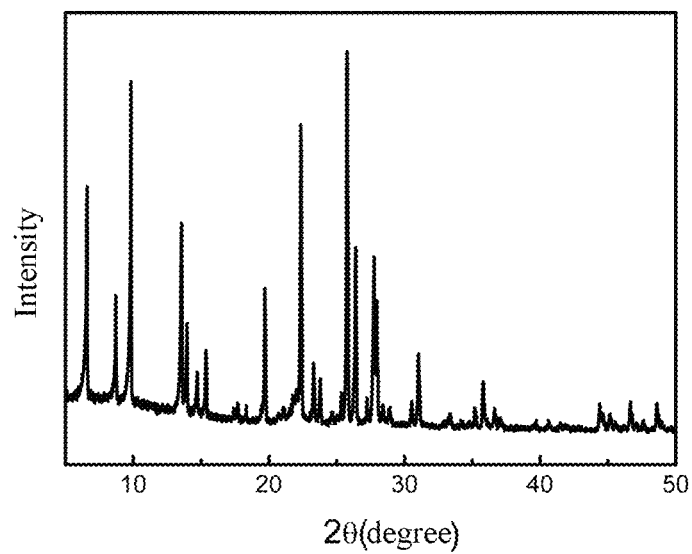
FIG. 22 is a XRD spectrum of a ZSM-35 prepared according to Comparative Example 1 of the present application.
Figure 23:
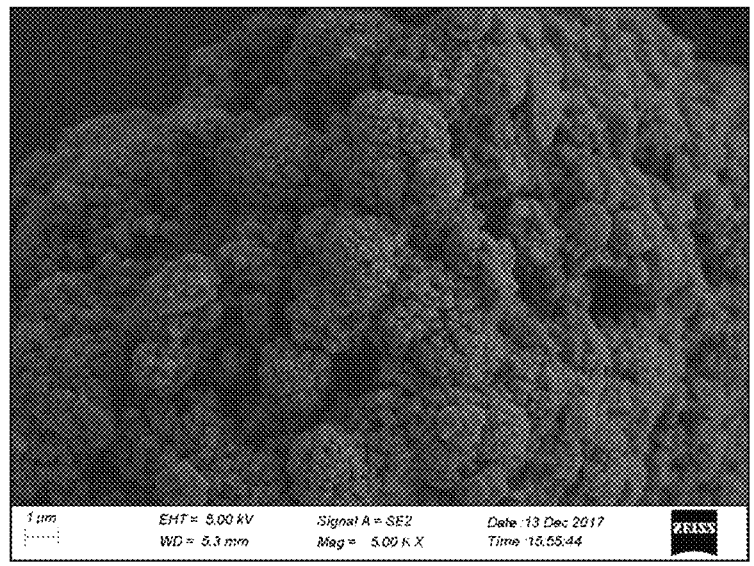
FIG. 23 is a 5000-fold magnified SEM photograph of the ZSM-35 prepared according to Comparative Example 1 of the present application.
Figure 24:
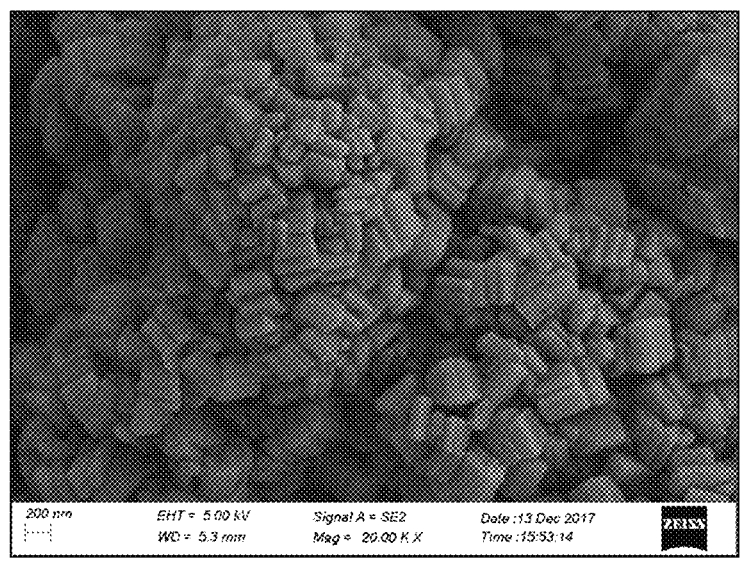
FIG. 24 is a 20000-fold magnified SEM photograph of the ZSM-35 prepared according to Comparative Example 1 of the present application.

It is determined through XRD that the phase of the synthetic product belongs to mordenite MOR, as shown in FIG. 22. It is determined through SEM that its crystal form is a massive aggregate formed by stacking of small cuboids, as shown in FIG. 23 and FIG. 24.

Comparative Example 2

0.25 g of sodium hydroxide having a purity of 99 wt. % and 1.061 g of potassium hydroxide having a purity of 95 wt. % were dissolved in 20 g of deionized water, and after stirring well, 1.23 g of sodium metaaluminate having a purity of 80 wt. % was added, continuing to stir until a clear and transparent solution is obtained. At the same time, 2.088 g of dipotassium hydrogen phosphate having a purity of 95 wt. % was dissolved in 10 g of deionized water, which was dropwise added to the above solution, stirring for 15 min, and then 24 g of silica sol having a concentration of 30 wt. % was dropwise added to the solution, a small amount of deionized water was supplemented after the addition of the silica sol was completed, intensely stirring for 30 minutes to obtain a reactant gel. The molar ratio of components in the reactant gel is about: 2.0Na$_2$O:3.5K$_2$O:20SiO$_2$:1Al$_2$O$_3$:2HPO$_4^{2-}$:600H$_2$O.

Under stirring, the reactant gel was aged at 25-40° C. for 2-4 h to prepare a reactant gel precursor.

The reactant gel precursor was transferred to a 100 mL reactor having polytetrafluoroethylene liner, and dynamically crystallized in an oven at 175° C. for 72 h with a rotational speed of 60 rpm. After the end of the crystallization, a resulting synthetic product was filtered, washed with deionized water until neutral, and then dried at 120° C. for 5 h.

Figure 25:
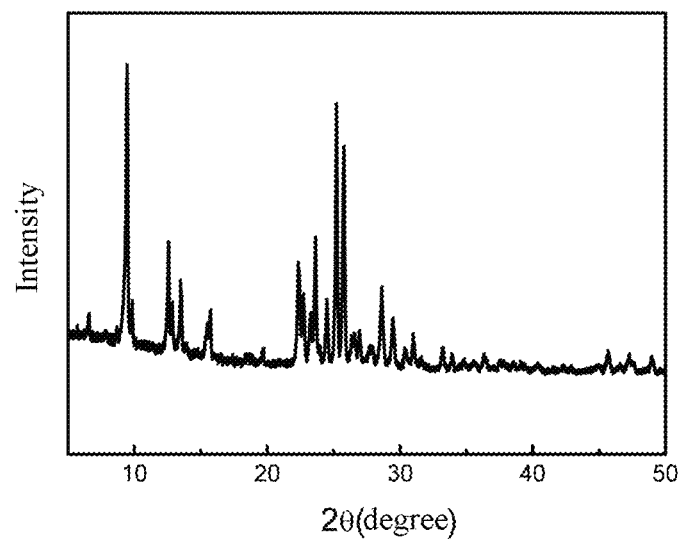
FIG. 25 is a XRD spectrum of a ZSM-35 prepared according to Comparative Example 2 of the present application.

It is determined through XRD that phase of the synthetic product belongs to a ZSM-35 molecular sieve, but characteristic diffraction peak of mordenite is appeared at 2θ=9.77°, as shown in FIG. 25.

Comparative Example 3

1.415 g of potassium hydroxide having a purity of 95 wt. % was dissolved in 20 g of deionized water, and after stirring well, 1.23 g of sodium metaaluminate having a purity of 80 wt. % was added, stirring until a clear and transparent solution is obtained. At the same time, 1.789 g of potassium chloride having a purity of 98 wt. % was dissolved in 10 g of deionized water, which was dropwise added to the above solution, stirring for 15 min, and then 24 g of silica sol having a concentration of 30 wt. % was dropwise added to the solution, a small amount of deionized water was supplemented after the addition of the silica sol was completed, intensely stirring for 30 minutes to obtain a reactant gel. The molar ratio of components in the reactant gel is about: 1.5Na$_2$O:4K$_2$O:20SiO$_2$:1Al$_2$O$_3$:600H$_2$O.

Under stirring, the reactant gel was aged at 25-40° C. for 2-4 h to prepare a reactant gel precursor.

The reactant gel precursor was transferred to a 100 mL reactor having polytetrafluoroethylene liner, and dynamically crystallized in an oven at 175° C. for 72 h with a rotational speed of 60 rpm. After the end of the crystallization, a resulting synthetic product was filtered, washed with deionized water until neutral, and then dried at 120° C. for 5 h.

Figure 26:
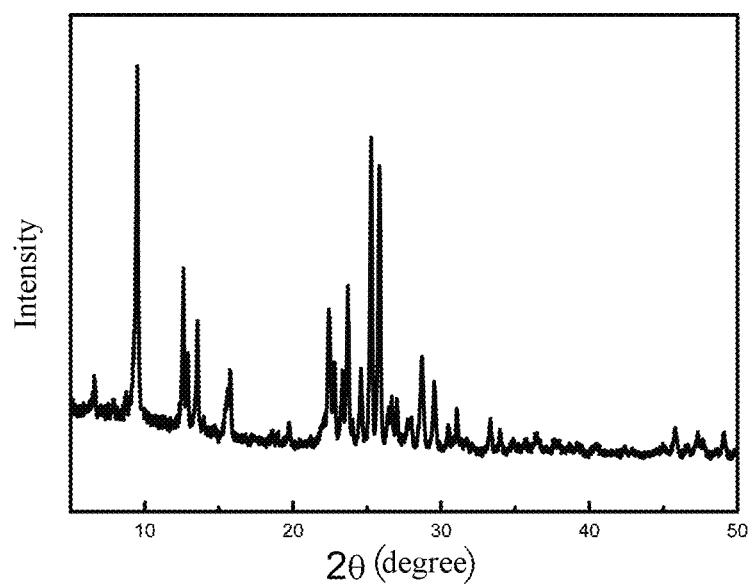
FIG. 26 is a XRD spectrum of a ZSM-35 prepared according to Comparative Example 3 of the present application.

It is determined through XRD that its phase belongs to a ZSM-35 molecular sieve, with a relative crystallinity of only 80.3%, as shown in FIG. 26.

Figure 27:
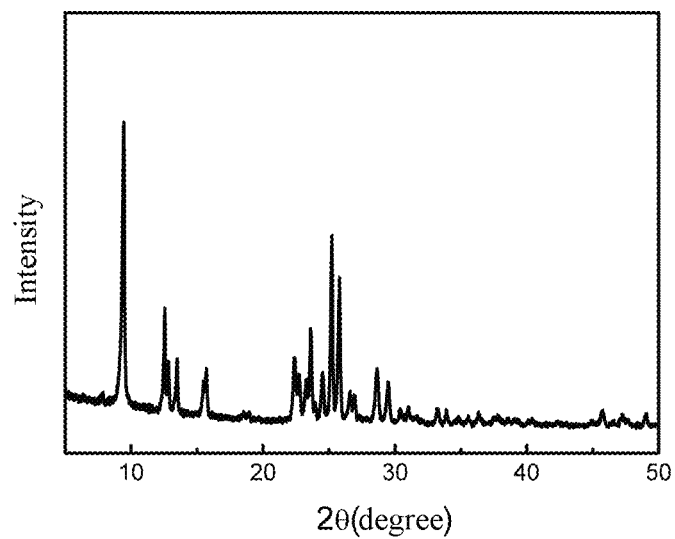
FIG. 27 is a XRD spectrum of the ZSM-35 prepared according to Comparative Example 3 of the present application.
Figure 28:
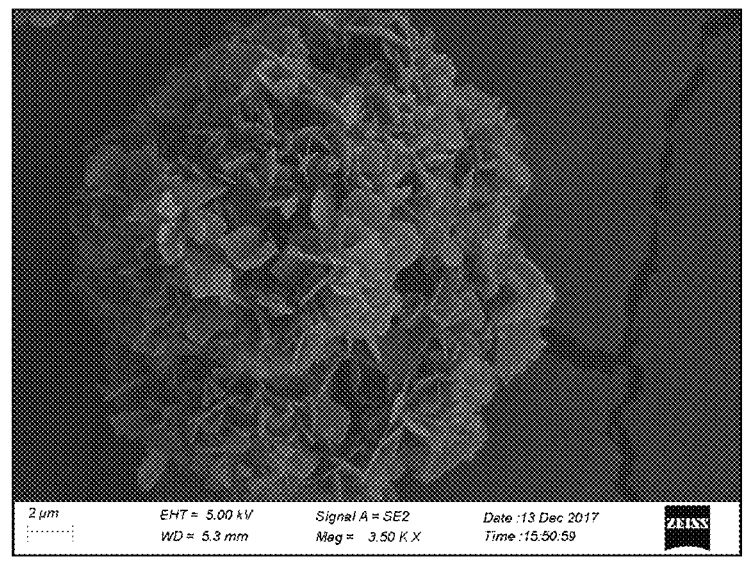
FIG. 28 is a 3500-fold magnified SEM photograph of the ZSM-35 prepared according to Comparative Example 3 of the present application.

A reactant gel with the same molar ratio was prepared, and the crystallization time was extended to 96 h. After the reaction was completed, a resulting synthetic product was washed with deionized water until neutral, then dried at 120° C. for 5 h. It is determined through XRD that phase of the synthetic product belongs to a ZSM-35 molecular sieve with a relative crystallinity of 99.3%, as shown in FIG. 27. It is determined through SEM that its crystal form is a sphere-like aggregate formed by stacking of crystal nanosheets, as shown in FIG. 28. It is determined through gas sorption analyzer that the sample had a BET specific surface area of 341 m$^2$/g, a microporous pore volume of 0.127 cm$^3$/g, a mesoporous pore volume of 0.119 cm$^3$/g, and mesopores thereof were distributed at 20-30 nm, while a certain amount of macropores were at 40-80 nm.

Comparative Example 4

1.415 g of potassium hydroxide having a purity of 95 wt. % was dissolved in 20 g of deionized water, and after stirring well, 1.23 g of sodium metaaluminate having a purity of 80 wt. % was added, stirring until a clear and transparent solution is obtained. At the same time, 1.789 g of potassium chloride having a purity of 98 wt. % was dissolved in 10 g of deionized water, which was dropwise added to the above solution, continuing to stir for 15 min, and then 2.4 g of ZSM-35 molecular sieve crystal seed were added to the solution, intensely stirring for 1 h, finally 24 g of silica sol having a concentration of 30 wt. % was dropwise added, a small amount of deionized water was supplemented after the addition of the silica sol was completed, intensely stirring for 30 minutes to obtain a reactant gel. The molar ratio of components in the reactant gel is about: $1.5Na_2O:4K_2O:20SiO_2:1Al_2O_3:600H_2O$.

Under stirring, the reactant gel was aged at 25-40° C. for 2-4 h to prepare a reactant gel precursor.

The reactant gel precursor was transferred to a 100 mL reactor having polytetrafluoroethylene liner, and dynamically crystallized in an oven at 175° C. for 72 h with a rotational speed of 60 rpm. After the end of the crystallization, a resulting synthetic product was washed with deionized water until neutral, and then dried at 120° C. for 5 h.

Figure 29:
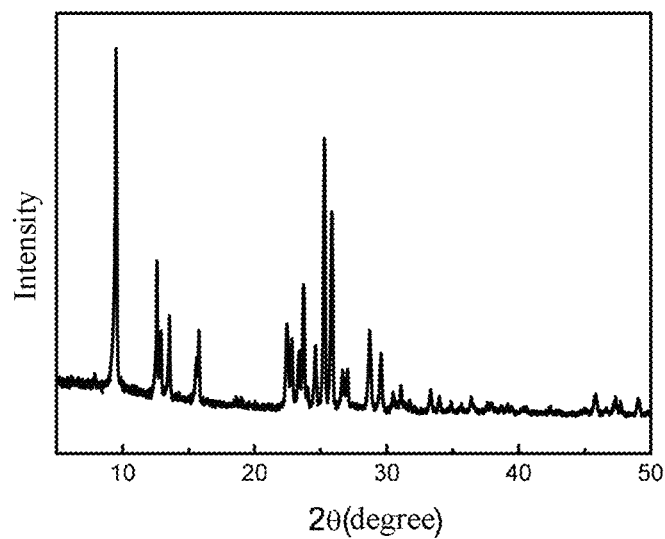
FIG. 29 is a XRD spectrum of a ZSM-35 prepared according to Comparative Example 4 of the present application.
Figure 30:
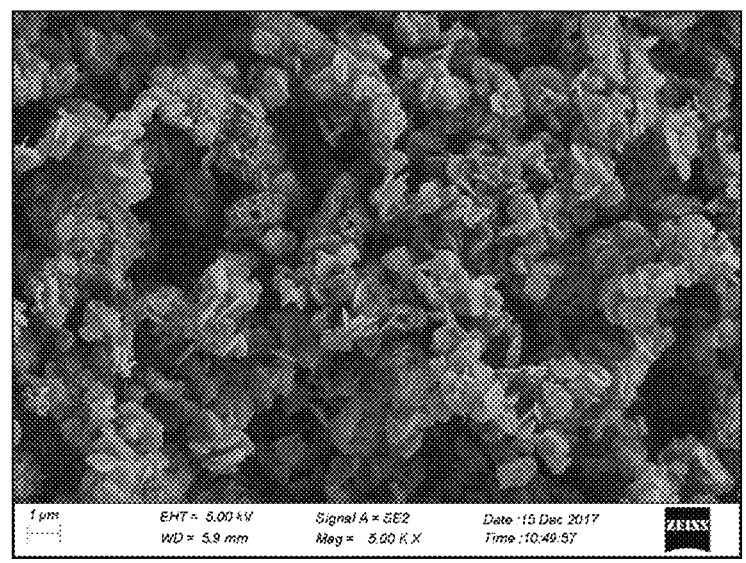
FIG. 30 is a 5000-fold magnified SEM photograph of the ZX-35 prepared according to Comparative Example 4 of the present application.

It is determined through XRD that its phase belongs to a ZSM-35 molecular sieve with a relative crystallinity of 100%, as shown in FIG. 29. It is determined through SEM that the crystal form of the ZSM-35 molecular sieve was lamellar, as shown in FIG. 30. It is determined through gas sorption analyzer that the sample had a BET specific surface area of 345 m²/g, a microporous pore volume of 0.162 cm³/g, and a mesoporous pore volume of only 0.066 cm³/g.

Finally, it should be noted that the foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments or make equivalent substitutions to some or all technical features therein; these modifications and substitutions will not make the spirit of the corresponding technical solutions depart from the scope of the technical solutions of the embodiments of the present application.

What is claimed is:

1. A preparation method of a ZSM-35 molecular sieve, wherein raw materials for the preparation method do not comprise an organic template agent and a seed crystal, comprising steps of:
   preparing a reactant gel wherein a molar ratio of $SiO_2$, $Al_2O_3$, $Na_2O$, $K_2O$, oxygen-containing acid radical and $H_2O$ is (20-40):1.0:(1.5-2.0):(4.0-6.5):(1.0-4.0):(600-1200);
   sequentially performing an aging treatment and a crystallization treatment on the reactant gel, and washing and drying a resulting synthetic product to obtain the ZSM-35 molecular sieve.

2. The preparation method according to claim 1, wherein reaction raw materials for preparing the reactant gel comprise an aluminum source, a silicon source, an acid phosphate, and water, and the oxygen-containing acid radical in the reactant gel is derived from the acid phosphate.

3. The preparation method according to claim 2, wherein the acid phosphate is selected from at least one of dipotassium hydrogen phosphate, disodium hydrogen phosphate, and diammonium hydrogen phosphate.

4. The preparation method according to claim 3, wherein performing the aging treatment on the reactant gel is at a temperature of 25-40° C., and an aging time is controlled to be not less than 2 h.

5. The preparation method according to claim 3, wherein the crystallization treatment has a temperature of 150-195° C. and a crystallization time of 48-120 h.

6. The preparation method according to claim 2, wherein the reaction raw materials further comprise one or more of sodium hydroxide, potassium hydroxide, sodium chloride and potassium chloride, to satisfy a pH of the reactant gel to 10-12 and a ratio of $Na_2O$ to $K_2O$.

7. The preparation method according to claim 6, wherein performing the aging treatment on the reactant gel is at a temperature of 25-40° C., and an aging time is controlled to be not less than 2 h.

8. The preparation method according to claim 6, wherein the crystallization treatment has a temperature of 150-195° C. and a crystallization time of 48-120 h.

9. The preparation method according to claim 2, wherein performing the aging treatment on the reactant gel is at a temperature of 25-40° C., and an aging time is controlled to be not less than 2 h.

10. The preparation method according to claim 2, wherein the crystallization treatment has a temperature of 150-195° C. and a crystallization time of 48-120 h.

11. The preparation method according to claim 1, wherein performing the aging treatment on the reactant gel is at a temperature of 25-40° C., and an aging time is controlled to be not less than 2 h.

12. The preparation method according to claim 1, wherein the crystallization treatment has a temperature of 150-195° C. and a crystallization time of 48-120 h.

13. The preparation method according to claim 12, wherein the crystallization treatment is a two-stage crystallization treatment, wherein:
   the first-stage crystallization treatment is performed at 150-175° C. for 6-24 h, and the second-stage crystallization treatment is performed at 175-195° C. for 48-72 h; or
   the first-stage crystallization treatment is performed at 175-195° C. for 6-24 h, and the second-stage crystallization treatment is performed at 150-175° C. for 6-72 h.

14. The preparation method according to claim 12, wherein the crystallization is a rotational dynamic crystallization with a rotation rate of 30-60 rpm.

15. The preparation method according to claim 1, wherein the crystallization treatment is a two-stage crystallization treatment, wherein:
   the first-stage crystallization treatment is performed at 150-175° C. for 6-24 h, and the second-stage crystallization treatment is performed at 175-195° C. for 48-72 h; or
   the first-stage crystallization treatment is performed at 175-195° C. for 6-24 h, and the second-stage crystallization treatment is performed at 150-175° C. for 6-72 h.

16. The preparation method according to claim 15, wherein the crystallization is a rotational dynamic crystallization with a rotation rate of 30-60 rpm.

* * * * *